Aug. 5, 1969   L. A. SCHLABACH   3,460,021
TRAPPED ENERGY RECOVERY CIRCUIT
Filed Jan. 25, 1967   2 Sheets-Sheet 1

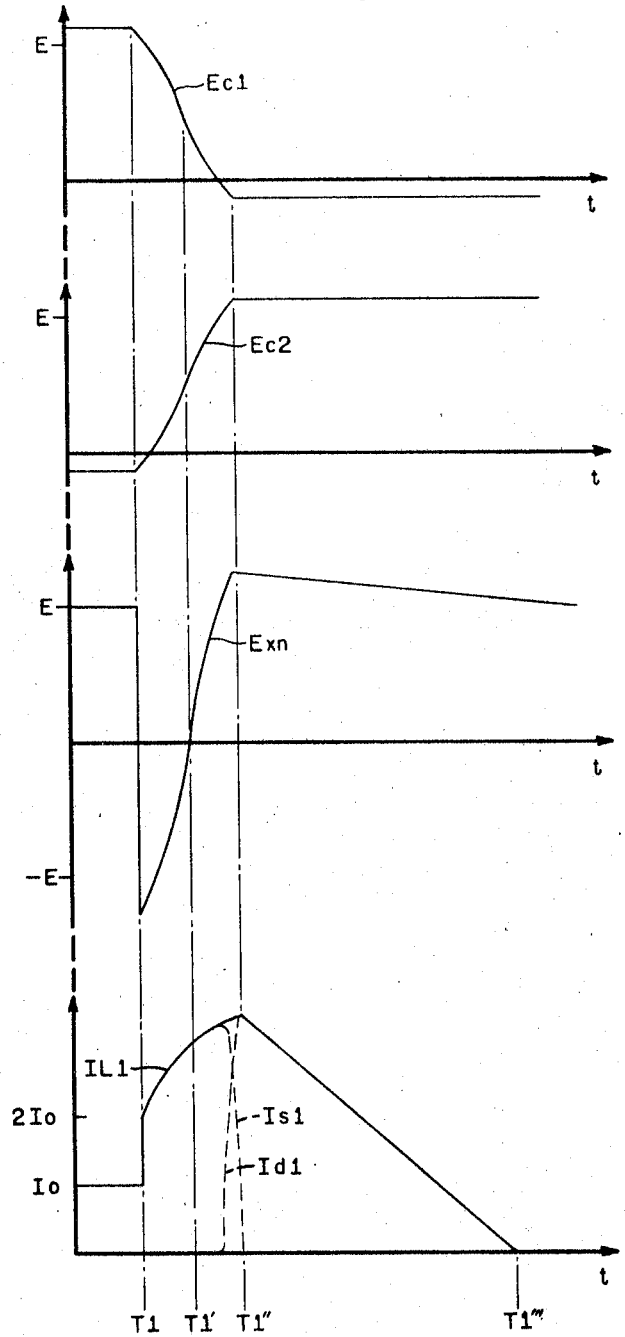

United States Patent Office 3,460,021
Patented Aug. 5, 1969

3,460,021
TRAPPED ENERGY RECOVERY CIRCUIT
Leland A. Schlabach, Pittsburgh, Pa., assignor to Westinghouse Electric Corporation, Pittsburgh, Pa., a corporation of Pennsylvania
Filed Jan. 25, 1967, Ser. No. 611,768
Int. Cl. H02m 7/20
U.S. Cl. 321—5                                  10 Claims

ABSTRACT OF THE DISCLOSURE

An energy recovery circuit for use in inverter apparatus of the forced commutation type, wherein the inverter is operative with a source of direct current for supplying alternating current to a load and includes a plurality of switching devices, such as silicon controlled rectifiers, for controllably completing a circuit to the load. A commutation circuit is utilized for turning off the controlled devices selectively by reverse biasing. The energy recovery circuit includes a transformer having a winding for receiving current due to stored energy from the commutation circuit, with a voltage being induced in another winding thereof. The stored energy is transferred to the direct current source when the induced voltage exceeds that of the source.

---

The present invention relates to circuitry for improving the efficiency of inverter systems and, more particularly, to energy recovery circuitry for use in forced commutated inverter systems for improving the efficiency thereof.

In inverter circuits utilizing controlled switching devices, such as silicon controlled rectifiers, it is necessary that the switching devices conduct current intermittently. Because of the inherent characteristics of a silicon controlled rectifier (SCR), once the device is rendered conductive between anode and cathode, gate control of the device is lost. In order to turn off the SCR, it is necessary that the anode to cathode current be reduced to below a hold value which is substantially zero current. The turning off of the controlled rectifiers thus must be effected by external commutation means. One technique termed "forced commutation" fires a commutation controlled rectifier which impresses a reverse voltage across the conducting controlled rectifiers in series with the load which causes the extinction of the current through these controlled rectifiers. A forced commutated inverter system is shown in copending application Ser. No. 520,497, filed Jan. 13, 1966, now Patent No. 3,406,325 by John Rosa and assigned to the same assignee as the present application, which requires only two commutation controlled rectifiers in a three-phase inverter system for turning off the respective silicon controlled rectifiers of the three-phase SCR bridge circuit used therein.

A common difficulty encountered in forced commutated inverter systems is that energy is trapped in the circuit after the commutation interval at the end of each half cycle of operation due to inductive reactance which is necessarily present in the circuit. To dissipate the trapped energy without causing excessive voltages to appear on the inverter circuit components, an additional current path is usually provided including a resistive element. The dissipation of this trapped energy, of course, decreases the efficiency of the overall inverter system. At low frequencies of operation the loss of the trapped energy is not appreciable. However, since this energy loss increases linearly with frequency, it becomes significant at higher frequency levels. Thus, it has been found that at frequencies above 60 Hz. power losses become quite high and may be of the order of 10 to 20% of the total operating power. It therefore become highly desirable to minimize this power loss due to trapped energy dissipation even at 60 Hz. levels. Moreover, it would be highly advantageous to recover the stored energy rather than to have it dissipated.

It is therefore an object of the present invention to provide a new and improved force commutator circuit including a trapped energy recovery circuit.

It is a further object to provide a trapped energy recovery circuit for use with a forced commutator inverter circuit which brings about high efficiency of operation of the inverter circuit.

It is a still further object to provide a new and improved trapped energy recovery circuit for use in a forced commutated inverter system which recovers trapped energy ratehr than dissipating this energy for high efficiency of operation while utilizing a minimum of additional circuit components.

Broadly, the above-cited objects are accomplished in inverter apparatus which employs a plurality of controlled switching devices controllably supplying current to a load. A commutating circuit is provided including a commutation switching device for extinguishing current flow through the controlled devices. An energy recovery circuit is employed including transforming means which is responsive to have a voltage induced therein in response to current flow in the commutating circuit. When this voltage exceeds the voltage of the direct current source, the trapped energy is transferred back into the direct current source.

These and other objects and advantages of the present invention will become more apparent when considered in view of the following specification and drawings, in which:

FIG. 3 is a waveform diagram comprising a plurality of curves used in the explanation of the operation of FIG. 1.

Figure 1:
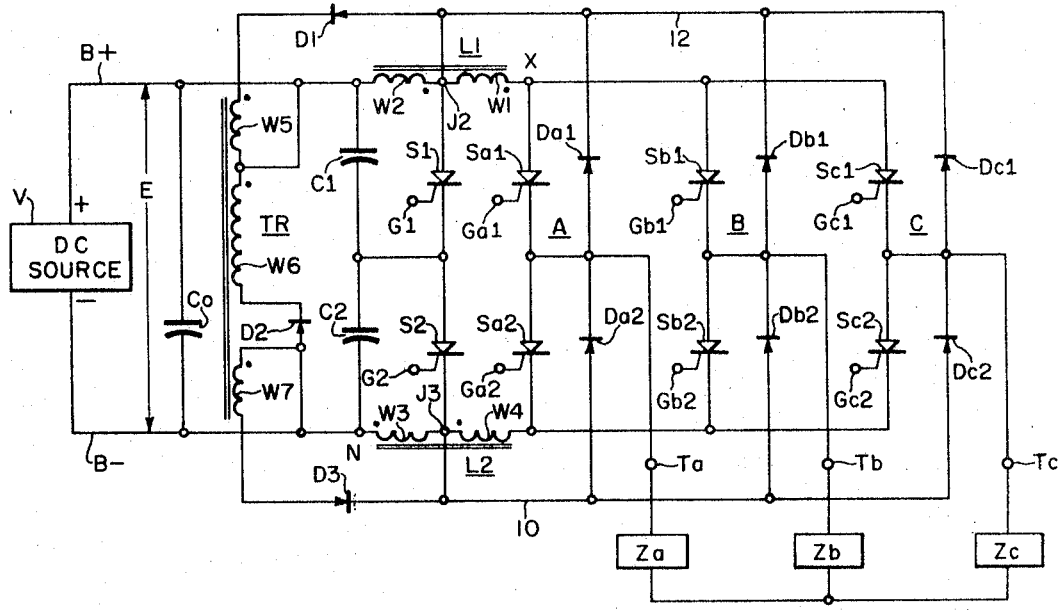
FIGURE 1 is a schematic diagram of the present invention.

Referring to FIG. 1, the DC energy for the inverter apparatus shown thereon is provided by a DC source V. The positive electrode of the D.C. source V is connected to a B+ line and the negative electrode thereof is connected to a B— line. Inverter apparatus as shown is designed for the generation of three-phase alternating current output at output terminals Ta, Tb and Tc to be supplied to a three-phase load which is indicated as the impedances Za, Zb and Zc. A three-phase bridge arrangement is utilized including a plurality of controlled rectifiers Sa1, Sa2, Sb1, Sb2, Sc1 and Sc2. Controlled rectifiers Sa1–Sa2, Sb1–Sb2, and Sc1–Sc2 are respectively connected in three legs A, B and C of the bridge arrangement.

The direct output voltage of the DC source V is indicated to be E appearing between the B+ and B— lines. A capacitor Co is connected directly across the DC source V between the B+ and B— lines.

Figure 2:
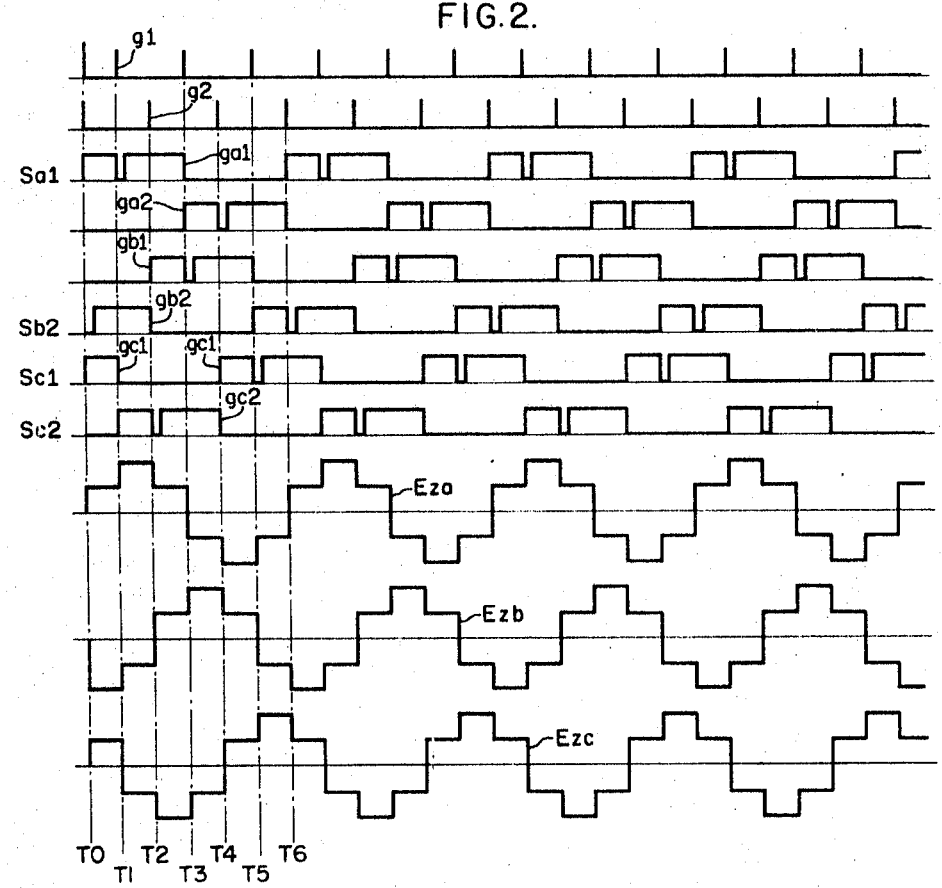
FIG. 2 is a waveform diagram comprising a plurality of curves used in explaining the operation of the present invention.

Referring now to the curves of FIGS. 2 and 3 and beginning the discussion at a time T0 as indicated on these figures, a controlled rectifier Sa1 of the leg A, and a controlled rectifier Sc1 of the leg C of the bridge arrangement are conductive at this time caused by the application of gating pulses ga1 and gc1 to the gate electrodes Ga1 and Gc1, respectively, the controlled rectifier Sb2 of leg B is made conductive after typically about 700 microseconds by application of gating pulse gb2 to electrodes Gb2, thereof, see FIG. 2. The above cited copending application describes circuitry suitable for supplying the gating pulses as indicated in FIG. 2 hereof.

A circuit path is thus completed during most of the time T0 to time T1 from the B+ line through an inductive reactor L1 to the controlled rectifier S$a$1, which has its anode connected to the dotted end X of the inductive reactor L1, the load impedance Z$a$, the load impedance Z$b$, the controlled rectifier S$b$2, and an inductive reactor L2, which has its undotted end connected to the cathode of the controlled rectifier S$b$2, to the B— line, which is connected at the dotted end N of the inductive reactor L2. Another conductive path is provided from the point X of the inductive reactor L1 through the device S$c$1, which has its anode connected thereto, to the load impedance Z$c$, the load impedance Z$b$, the device S$b$1, to the undotted end of the inductive reactor L2 and therethrough to the B— line.

During the times T0 and T1, a capacitor C1 is charged to a voltage E$c$1, as shown in curve E$c$1 of FIG. 3, while a capacitor C2 is charged to a voltage E$c$2, as shown in the curve E$c$2 of FIG. 3. The capacitor C1 is connected between the undotted end of the inductive reactor L1 and a junction point J1. The capacitor C2 is connected between the junction point J1 and the dotted end of the inductive reactor L2. The inductor L1 has a tap point J2 thereon so that a winding W1 is formed between the dotted end X and the tap point J2, and a winding W2 is formed between the tap point J2 and the undotted end thereof. The inductive reactor L2 has a winding W3 formed between the dotted end N thereof and a tap point J3 thereon and a winding W4 formed between the tap point J3 and the undotted end thereof.

A controlled rectifier S1 is connected with its anode to the tap point J2 of the inductor reactor L1 and its cathode connected to the junction point J1. The cathode of a controlled rectifier S2 is connected to the tap point J3 of the inductive reactor J3, with the anode thereof being connected to the junction point J1. The controlled rectifiers S1 and S2 form the commutation controlled rectifiers of the inverter circuit.

As can be seen in FIG. 3, the capacitor C1 voltage E$c$1 becomes slightly higher than the source voltage E during the time period T0 to T1, while the capacitor voltage shown in curve E$c$2 for the capacitor C2 becomes slightly negative during the same time period. The curve E$xn$ of FIG. 3 shows the voltage appearing between the points X and N in FIG. 1 and is shown to be at the source voltage E during this time period. To turn off the controlled rectifiers S$a$1 and S$c$1 in the top row of the bridge circuit, it is necessary that a reverse voltage be applied thereacross to effect the commutation of these devices. To accomplish this, the controlled rectifier S1 is turned on at the time T1 by the application of a pulse $g$1 to the gate electrode G1 thereof as shown by the curve $g$1 in FIG. 2. The turning on of the controlled rectifier S1 causes the capacitor C1 that had been previously charged to the voltage E$c$1 to discharge through the winding W2 of the inductive reactor L1. The discharge path is into the undotted end of the winding W2. Thus, a negative potential appears at the dotted X end of the winding W1. Due to the autotransformer effect of the inductive reactor L1 including the windings W1 and W2 the potential that is induced thereacross is somewhat more than twice the magnitude of the source voltage E, with the X end of the winding W1 having a negative polarity. Since the anodes of the controlled rectifiers S$a$1, S$b$1 and S$c$1 are connected thereto these controlled rectifiers will be reversed biased from time T1 to T1' in FIG. 3 which will extinguish the current flow therethrough. The potential which exists between the X end of the inductive reactor L1 and the N end of the inductive reactor L2 is shown in the curve E$xn$ of FIG. 3 at the time T1 and has a magnitude somewhat greater than —E. The anodes of the controlled rectifier S$a$1, S$b$1 and S$c$1 are thus reduced to potential more negative than the negative bus line B—; thus, the previously conductive controlled rectifiers S$a$1 and S$c$1 will be turned off.

At the time T1, with the controlled switch S1 conductive a charging path is provided for the capacitor C2 so that the capacitor C2 will begin to charge positively as shown in the curve E$c$2, while the capacitor voltage E$c$1 discharges to a slightly negative voltage as can be seen from the curves of FIG. 3. The capacitor C1 charges to a slightly negative potential due to the inductive reactance of the inductive reactor L1. The controlled rectifier S1 is thus turned off by this reverse voltage.

It should be noted at time T1 that gating signal $gb$2 is still applied to the gate electrode of device S$b$2. However, the gate signals $gc$1 and $ga$1 are terminated from being applied to the controlled rectifiers S$a$1 and S$c$1. At the time T1, a gating pulse $gc$2 is applied to the gate controlled switch S$c$2 as is shown in the curves of FIG. 2. After time T1 (i.e. at or after time T1''' in FIG. 3) a gating signal $ga$1 is reapplied to S$a$1.

Since the controlled rectifiers S$a$1, S$b$2 and S$c$2 are conductive during the time period T0 to T1 a current path is provided through the controlled rectifier S$a$1 through the load Z$a$ and the loads Z$b$ and Z$c$ through the controlled rectifiers S$b$2 and S$c$2, respectively, to the B— line.

During the time interval T1 to T1' that the potential at the point X is lowered due to the discharging of the capacitor C1 and the charging of capacitor C2, load current is maintained through a path beginning at the output terminal T$b$ through the device S$b$2, the winding W4, to a line 10 which has connected thereto the anodes of diodes D$a$2, D$b$2 and D$c$2, the cathodes of the diodes D$a$2, D$b$2 and D$c$2 being connected respectively to the output terminals T$a$, T$b$ and T$c$, with the circuit path being completed through the diodes D$a$2 and D$c$2, the impedance elements Z$a$ and Z$c$ and through the impedance element Z$b$ to the output terminal T$b$.

The curve IL1 shows the current which appears in the inductive reactor L1, winding W2 during the indicated time periods. The curves EZA, EZB and EZC indicate the voltage waveforms that appear across the load Z$a$, Z$b$ and Z$c$ respectively during the indicated time periods under normal and essentially full conduction operation.

The operation of the energy recovery circuit of the present invention will now be described. At the time T1 the capacitor C1 begins its discharge through the winding W2 and the controlled rectifier S1 with the capacitor C1 reaching a zero voltage at a time just prior to T1'', as indicated in FIG. 3. As a consequence of the current flowing in the winding W2 into the undotted end thereof, energy will be trapped in this winding. At the just indicated time part of the current flowing through the winding W2 begins flowing through a diode D1 which has its anode electrode connected to the tap point J2 of the inductive reactor L1. The cathode of the diode D1 is connected to a winding W5 at the dotted end thereof. The winding W5 comprises on of the windings of an autotransformer TR. The undotted end of the winding W5 is connected to the B+ line at the undotted end of the winding W2. Current will thus begin to flow from the tap point J2 through the diode D1 into the dotted end of the winding W5 of the autotransformer TR to the undotted end of the winding W2. The voltage across the winding W2 and the winding W5 increases with time since current is still flowing into the capacitor C1. In response to current flow in the winding W5, a voltage is induced in a winding W6 of the autotransformer TR. The winding W6 has its dotted end connected to the undotted end of the winding W5 and also to the B+ line. The undotted end of the winding W6 is connected to the cathode of a diode D2. The anode of the diode D2 is connected to the B— line.

An increasing voltage is thus induced in the winding W6. When the voltage across the winding W6 becomes slightly greater than the voltage appearing across the capacitor C$o$, which is the source voltage E, current can increase rapidly from zero to a high value through the winding W6, from the undotted to the dotted end thereof, since the capacitor Co will act as a very low impedance load to the rapidy increasing current. The capacitor Co is so selected to have a low impedance to the rapidly increasing current. With the capacitor Co providing a low impedance load for the autotransformer TR, the autotransformer TR will act as a low impedance load on the winding W2 of the inductive reactor L1. Thus, the current flowing through the capacitor C1 and the controlled rectifier S1 will begin flowing through the diode D1 and the winding W5. This can be seen in the curve IL1 with the diode D1 current $Id1$ increasing while the current $Is1$ of the controlled rectifier S1 is decreasing. Since the autotransformer T8R is now the only load on the winding W2, the energy trapped in the winding W2 will rapidly be transferred from the inductive reactor L1 through the winding W6 of the autotransformer TR back into the capacitor Co and into the DC source V, with the trapped energy being almost completely recovered. The current $Is1$ through the controlled rectifier S1 is reduced to substantially zero at the time T1''' when the capacitor C1 is discharged to its somewhat negative potential. The controlled rectifier S1 will thus be rendered non-conductive. It is to be noted to insure that energy recovery takes place that during the time interval T1'' to T1''' that if any of the controlled rectifiers $Sa1$, $Sb1$, $Sc1$ are turned on a low impedance path would be applied across winding W1 and thus across winding W2. Thus, the returning on of any one of these must be delayed until after the time T1''' when the current through winding W2 has gone to zero.

The diode D1 is so poled to prevent reverse current from being applied through the inductive reactor L1, and the diode D2 is so poled to prevent the winding W6 of the transformer TR from short circuiting the DC source V.

At the time T2 (see FIG. 2), the commutation cycle for the bottom row ($Sa2$, $Sb2$ and $Sc2$) of the controlled rectifiers of the bridge arrangement is to take place with the controlled rectifiers $Sb2$ and $Sc2$ to be turned off. At the time T2 the controlled rectifier S2 is gated on by applying a pulse $g2$ as shown in FIG. 2 to the gate electrode G2 thereof. The discharge of the capacitor C2 through the controlled rectifier S2 causes a current flow through the winding W3 of the inductive reactor L2, and, due to the autotransformer connection of the windings W3 and W4, a positive potential will exist at the undotted end of the winding W4 to which the cathode electrodes of the controlled rectifiers $Sa2$, $Sb2$ and $Sc2$ are connected. This will thus reverse bias the controlled rectifiers in the bottom half of the bridge array which will extinguish the current flow thereto and turn off these controlled rectifiers. However, at the time $t2$, a gate pulse is continued to be supplied to the gate electrode of the controlled rectifier $Sa1$ as is shown by curve $ga1$ of FIG. 2. However, no pulse is applied at the time T2 to the gate electrode $Gb2$ of the controlled rectifier $Sb2$ which will cause this device to remain off. At the time T2 the controlled rectifier $Sb1$ is turned on and about 700$\mu$ seconds or more later, a gate signal $gc2$ is reapplied $Sc2$ to supply load current to the loads $Za$, $Zb$ and $Zc$ as indicated in the respective curves EZA, EZB and EZC of FIG. 2 during the time period between T2 and T3. During the time interval when the capacitor C2 is being discharged through the controlled rectifier S2, the capacitor C1 is being recharged to a positive potential therethrough and will again appear at a positive polarity $Ec1$ such as shown in the corresponding curve of FIG. 3.

During the commutating period, current is maintained to the load elements $Za$, $Bb$ and $Zc$ with a current path being maintained from the output terminal $Ta$ through the load impedance $Za$, load impedances $Zb$ and $Zc$, the output terminals $Tb$ and $Tc$, respectively, the diodes $Db1$ and $Dc1$, respectively, to a line 12 to which the cathodes of the diodes $Da1$, $Db1$ and $Dc1$ are connected, to the tap J2 of the inductive reactor L1, through the controlled rectifier $Sa1$ to the output terminal $Ta$.

The energy recovery operation is substantially similar as that discussed with respect to the inductive reactor L1. Since energy is stored in the inductive reactor L2 due to the current flow therein it is necessary that this energy be recovered. At a time after the time T2 when the capacitor C2 has discharged to a substantially zero voltage level, current will begin to flow through a diode D3 and a winding W7 of the autotransformer TR. The cathode of the diode D3 is connected to the tap J3 of the inductive reactor L2, with its anode being connected to the undotted end of the winding W7. The dotted end of winding W7 is connected to the dotted end of the winding W3 of the inductive reactor L2. The diode D3 prevents reverse current from flowing through the inductor L2. Noting the dot convention on the winding W7 and the winding W6 of the autotransformer TR, as the current flows through the winding W7, the voltage appearing across the winding W6 will also increase accordingly. When the voltage across the winding W6 exceesd that of the voltage across the capacitor C2, which is the source voltage E, the capacitor Co will appear as a very low impedance to the rapidly increasing current from the winding W6. Capacitor Co providing a low impedance load to the autotransformer TR, it in turn, will provide a low impedance load for the inductive reactor L2. The energy appearing in the inductive reactor L2 will thus rapidly be transferred to winding W6 and to the capacitor C2 and thence into the DC source V. Thus, the energy recovery operation is completed for this portion of the cycle.

At the time T3, see FIG. 2, the controlled rectifier S1 is again gated on to initiate the commutating action to turn off the controlled rectifier $Sa1$ and $Sb1$, with the controlled rectifier $Sc2$ being supplied with a gating drive at this time. The operation of the inverter apparatus will then proceed substantially the same fashion as previously described for the commutation and energy recovery operation. The curves of FIG. 2 define the operation and explain succeeding cycles to develop the three-phase output waveform EZA, EZB and EZC as shown thereon.

In summary, the recovery circuit for use in the forced commutation inverter circuit as shown thus recovers substantially all the trapped energy in the inductive reactors L1 and L2 and therefore effects a highly efficient inverting operation. The energy recovery circuit requires only the autotransformer TR including the windings W5, W6 and W7 and the diode D2 in order to accomplish the energy recovery function.

Although the present invention has been described to a certain degree of particularity it should be understood that the present disclosure has been made only by way of example and that numerous changes in the details of construction and the combination and arrangement of elements and components can be resorted to without departing from the scope and spirit of the present invention.

I claim as my invention:

1. In inverter apparatus operative with a direct current source for supplying alternating current to a load and including a plurality of controlled switching devices for controllably completing a circuit to said load, the combination of:

a commutation circuit including,
    inductance means operatively connected between said source and said plurality of controlled switching devices,
    capacitance means operatively connected to said source and said inductance means, and
    a commutation controlled switching device operatively connected to said inductance means;
an energy recovery circuit including,
    transforming means including a first winding operatively connected to said inductance means and a second winding operatively connected to said source; and
    means for controlling said commutation controlled switching device to discharge said capacitance means and effect commutation to turn off selected of said plurality of controlled switching devices, current being supplied to said first winding from said inductance means only after said commutation and before turning on selected of said plurality of controlled switching devices to induce a voltage in said second winding, when said voltage induced in said second winding exceeds the voltage of said direct current source, the energy stored in said inductance means being transferred to said direct current source.

2. The combination of claim 1 wherein:
said plurality of controlled switching devices and said commutation switching device comprise controlled rectifier devices.

3. The combination of claim 2 including:
source capacitance means operatively connected across said direct current source to provide a low impedance path to current from said inductance means when said voltage induced in said second winding exceeds the voltage of said direct current source to effect the transfer of energy stored in said inductance means to said source.

4. The combination of claim 3 wherein:
said inductance means includes an inductive reactor having a tap thereon,
said first winding of said transformer means and said commutation controlled rectifier device operatively connected to said tap.

5. The combination of claim 4 wherein:
said energy recovery circuit including a unidirectional device operatively connected between said tap on said inductive reactor and said first winding of said transformer means to prevent the passage of reverse current through said first winding.

6. The combination of claim 3 wherein:
said energy recovery circuit including a unidirectional device operatively connected in series with said second winding to prevent a short circuit from existing through said second winding across said direct current source.

7. In inverter apparatus operative with a direct current source for supplying polyphase alternating current to a polyphase load and including a controlled rectifier bridge circuit for controllably completing a circuit to said load the combination of:
a commutation circuit including a first and a second inductive reactor, respectively, connected between the positive and negative electrodes of said direct current source and said controlled rectifier bridge circuit,
first and second commutation controlled rectifier devices connected in series between said first and second inductive reactors,
first and second capacitors operatively connected, respectively, across each of said commutation controlled rectifier devices through a portion of said first and second inductive reactors; and
an energy recovery circuit including,
transforming means comprising a first winding operatively connected to said first inductive reactor, a second winding operatively connected across said direct current source and a third winding operatively connected to said second inductive reactor,
means for controlling said first and second commutation controlled rectifier devices to discharge, respectively, said first and second capacitors to effect commutation to turn off selected of the controlled rectifier devices of said controlled rectifier bridge circuit,
current being supplied to said first or third windings from said first or second inductive reactors respectively, only after said commutation and before turning on selected of said controlled switching devices to induce a voltage in said second winding, whenever said voltage induced in said second winding exceeds the voltage of said direct current source, the stored energy in the respective inductor reactor being transferred to said source.

8. The combination of claim 7 including:
load capacitance means operatively connected across said direct current source to provide a low impedance path to current from said first and second inductive reactors when said voltage induced in said second winding exceeds the voltage of said source to effect the transfer of energy stored in said inductive reactors to said source.

9. The combination of claim 8 wherein:
said first and second inductive reactors including a tap thereon,
said commutation controlled rectifier devices being operatively connected between said taps, and
said energy recovery circuit including a first and second unidirectional device, respectively, connected between the tap on said first and second inductive reactors and said first and third windings to prevent the passage of reverse current therethrough.

10. The combination of claim 8 wherein:
said energy recovery circuit including a unidirectional device operatively connected in series with said second winding of said transforming means to prevent a short circuit from existing through said second winding across said direct current source.

References Cited

UNITED STATES PATENTS

| | | | |
|---|---|---|---|
| 3,263,153 | 7/1966 | Lawn | 321—45 |
| 3,308,371 | 3/1967 | Studtmann | 321—45 |
| 3,311,809 | 3/1967 | Corey et al. | 321—45 |
| 3,343,068 | 9/1967 | Studtmann et al. | 321—45 |
| 3,349,315 | 10/1967 | Studtmann | 321—45 |

JOHN F. COUCH, Primary Examiner

W. H. BEHA, JR., Assistant Examiner

U.S. Cl. X.R.
321—45